Feb. 19, 1929.  
H. L. HUBBARD  
1,703,039  
LUBRICATING SYSTEM FOR AUTOMOBILES  
Filed May 2, 1927
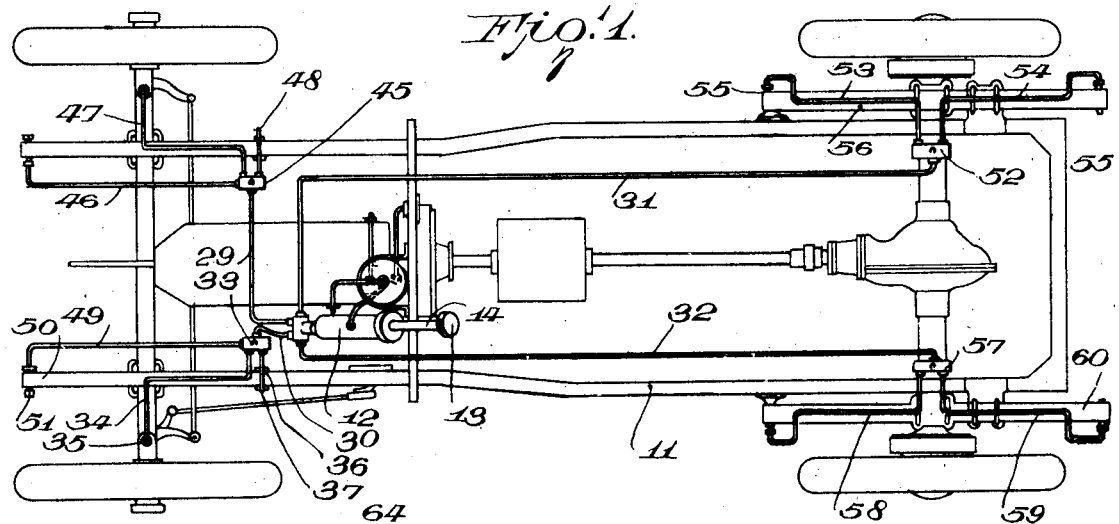
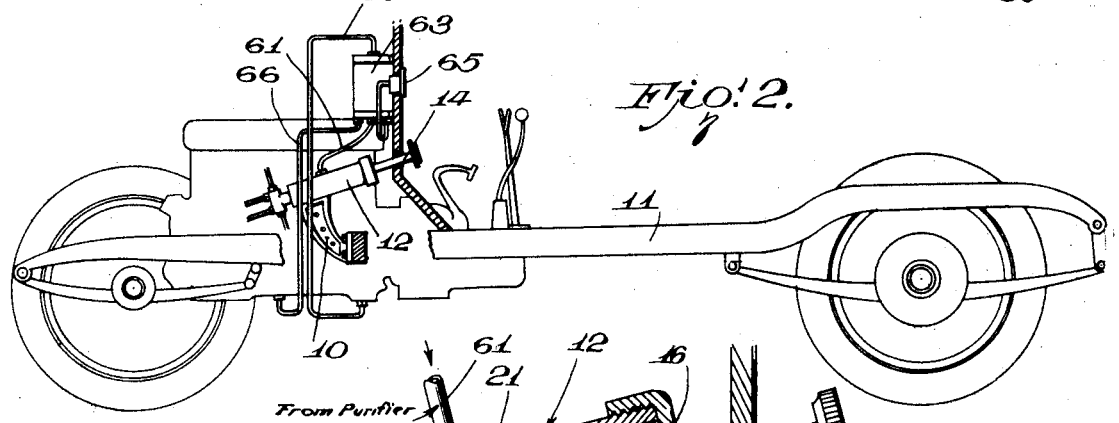
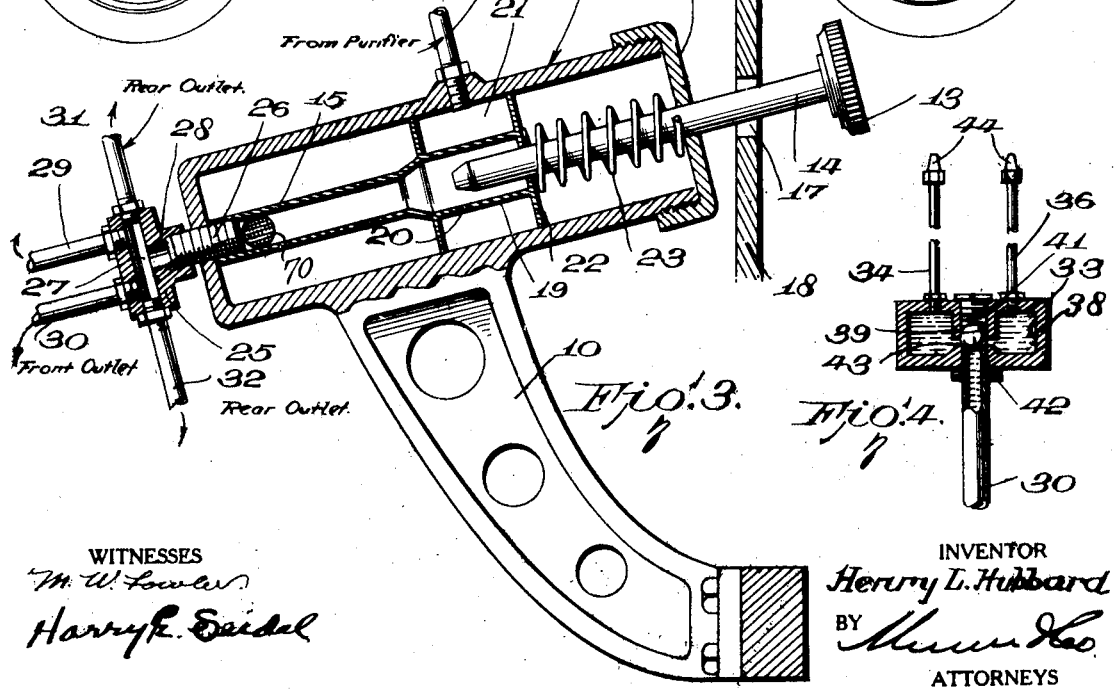
WITNESSES  
M. W. Fowler  
Harry R. Seidel
INVENTOR  
Henry L. Hubbard  
BY  
ATTORNEYS Patented Feb. 19, 1929.

1,703,039

UNITED STATES PATENT OFFICE.

HENRY L. HUBBARD, OF CLEVELAND, OHIO.

LUBRICATING SYSTEM FOR AUTOMOBILES.

Application filed May 2, 1927. Serial No. 188,265.

This invention relates to a device for lubricating the chassis of an automobile.

An object of the invention is the provision of a centralized lubricating system which is simply and economically constructed and which includes a reservoir for the lubricant which will be automatically filled from preferably an oil purifier or from the pressure line for lubricating the motor.

A further object of the invention is the provision of a centralized lubricating system which includes a reservoir having a plunger therein which when the same is operated manually it will supply lubricant to the various parts of the chassis which can be readily reached.

Another object of the invention is the provision of a centralized lubricating system for forcing oil to the various parts of the chassis and in which a reservoir is included in the system and provided with a cylinder and plunger for forcing the lubricant through the various primary channels or conduits which is then distributed from valve blocks connected by means of secondary conduits with the parts to be lubricated, the bores of the secondary lines or the ports in the valve blocks being calibrated to supply the proper quantity of lubrication to the parts.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawing:

Figure 1 is a plan view of a chassis of an automobile showing my lubricating system applied thereto, Figure 2 is a longitudinal vertical section of Figure 1, Figure 3 is a vertical section of the reservoir and pumping mechanism associated therewith, and Figure 4 is a horizontal section of the valve block which connects the secondary conduits with the primary lubricating conduits.

Referring more particularly to the drawings 10 designates an arm or bracket which is adapted to be bolted either to one of the supporting arms of the motor or directly to the frame 11 of the chassis. This arm may be formed integrally or may be connected to a housing 12 which is disposed at such an angle so that the treadle or foot plate 13 formed at the outer end of a plunger 14 may be conveniently engaged by the foot and forced inwardly for forcing the lubricant through the system which will be presently described. The housing 12 is shown of cylindrical form and is provided with a central cylinder 15 into which the inner end of the piston 14 is adapted to be forced. The outer end of the reservoir is closed by a threaded cap 16 and adjacent an opening 17 in the dash 18 through which the piston is adapted to be reciprocated.

The outer end of the cylinder 15 is provided with an enlarged portion 19 having openings 20 for placing the enlarged portion of the cylinder in communication with a reservoir 21. This reservoir is located intermediate the opposite ends of the housing 12. A circular plate 22 which forms the outer end of the reservoir and isolates the same from the housing 12 is provided with a passage through which is adapted to be moved the piston 14. The cap 16 is likewise provided with a passage to receive the piston and in co-operation with the passages in the member 22 and the cap 16 the piston is alined for longitudinal movement of the cylinder 15. A spring 23 embracing the piston 14 has one end in engagement with the closure plate 22 of the reservoir and its other end secured to the plunger 14 adjacent the cap 16 whereby the piston will tend to be projected from the housing and in position for operation by the foot.

A casing 25 is secured to the housing 12 and to the inner end of the cylinder 15 by means of a threaded connection 26. This casing is provided with a passage 27 and a passage 28 connecting the passage 27 with the cylinder 15 through the hollow connection 26. A pair of conduits 29 and 30 are in open communication with the passage 27 in the casing 25 and are extended through the forward part of the chassis, as shown in Fig. 1. A pair of pipes 31 and 32 are connected with the casing 25 and are extended rearwardly.

The pipe 30 is connected to a valve casing 33 and a secondary conduit 34 connects the valve casing with the bearing for the spindle 35. A pipe 36 connects the valve casing 33 with the member 37 which is the rear shackle of the front spring. Each valve casing, as shown in Fig. 4, consists of a hollow member having a chamber 38 therein in which projects a boss 39. The outer open end of the boss is closed by a plug 40 against which presses a spring 41. The spring likewise is in engagement with a ball valve 42 forced against a valve seat 43 at the inner end of the conduit 30. The secondary conduits 34 and 36 are in open communication with the chamber 38 and have threaded ends 44 adapted to be screwed into threaded openings formed in the respective elements to which the secondary conduits are adapted to supply lubricant. The pipe 29 is connected with a valve casing 45 in which run secondary condits 46, 47, and 48. Conduit 48 leads to the rear shackle of the other front spring. A conduit 49 also runs from the valve block 33 to the forward end of a spring 50 for lubricating the bolt of the shackle 51.

The pipe 31 is in communication with a valve block or casing 52 from which extends secondary conduits 53 and 54, such conduits terminating in threaded nipples which are screwed into threaded openings of those elements to which they are adapted to conduct lubricant such as the bolts 55 of the rear vehicle springs 56. The conduit 32 is in communication with the valve casing or block 57 having secondary pipes 58 and 59 conducting lubrication to the shackles of a vehicle spring 60.

A pipe 61 is directly connected with a device 63 described as an oil purifier for eliminating impurities from the oil before it is sent to the various parts to be lubricated. The pipe 64 is in communication with the member 63 and is connected with the pressure line from the motor. An oil catch 65 is connected with the oil purifier 63. A pipe 66 connects the oil purifier with the lubricating oil from the motor and from which the oil is directly connected from the purifier before it reaches the reservoir 21.

The bore of the pipes leading from the valve casings to the various parts to be lubricated are to be so calibrated that they will supply the proper quantity of oil to the parts as may be needed while preventing return of the oil to the innermost parts of the system and also adapted to retain a certain amount of lubrication in the calibrated pipes to permit lubrication of the parts over a predetermined period.

A screening device 70 is located in the outer end of the cylinder 14 and adjacent to the member 26 for removing foreign matter from the lubricant before it is forced to the bearings.

I claim:

In an automobile having parts to be lubricated, a lubricating system comprising a housing having spaced partitions intermediate the ends thereof, an oil supply pipe connected with the housing and in open communication with the space between the pairs of partitions, a cylinder located axially of the housing and having an expanded portion located within the space between the pair of partitions one of the partitions being provided with a passage, a plunger slidably mounted in the passage and movable into the enlarged end of the cylinder, said enlarged end having a passage for placing the cylinder in communication with the space, and a conduit connecting the valve casing with the parts to be lubricated.

HENRY L. HUBBARD.